United States Patent [19]

Plummer et al.

[11] Patent Number: 4,559,830
[45] Date of Patent: Dec. 24, 1985

[54] TESTING DEVICE FOR FASTENERS

[76] Inventors: Raymond Plummer; Ilene Plummer, both of 522 Berkham, Napoleon, Ohio 43545

[21] Appl. No.: 594,739

[22] Filed: Mar. 29, 1984

[51] Int. Cl.$^4$ ............................................. G01N 3/00
[52] U.S. Cl. .................................................... 73/761
[58] Field of Search .................. 73/761, 859; 411/368, 411/371

[56] References Cited

U.S. PATENT DOCUMENTS

| | | | |
|---|---|---|---|
| 1,011,245 | 12/1911 | Rafter | 411/368 |
| 4,090,399 | 5/1978 | Babcock | 73/761 |
| 4,231,281 | 11/1980 | Reinwall | 411/371 |
| 4,498,825 | 2/1985 | Pamer et al. | 73/761 |

*Primary Examiner*—Anthony V. Ciarlante
*Attorney, Agent, or Firm*—Kenneth F. Cherry

[57] ABSTRACT

This invention is a device to test fastener heads and thread run-out areas for mechanical strength and detect defects. A fastener head is placed through a hole in a wedge-shaped washer and the shaft put under tension so that the fastener head completely contacts the wedge shaped washer. The stress produced is calculated to be within the elastic limit of the material and produces a stress in the shaft near the fastener head similiar to that shown in FIG. 3. If the fastener is defective or is non-conformant to state-of-the-art standards, the fastener will fail when this test device is used. This method allows improved detection of hydrogen embrittened and improper heat treating processes which results in fasteners that will have unsatisfactory mechanical properties.

7 Claims, 13 Drawing Figures

Q, $C_1$, $C_2$, AND T ARE FORCES.
T = ECCENTRIC LOAD
$Y_1$, $Y_2$ IS THE ASSUMED POINT OF CONTACT
OF THE BENDING SHAFT OF THE FASTENER.

TESTING DEVICE FOR FASTENERS

FIELD OF THE INVENTION

This invention relates to testing apparatus and procedures for fastener bolts and the like.

BACKGROUND OF THE INVENTION

In the fabrication of bolts, cap screws, pins and similar fastening devices numerous manufacturing operations may result in decreased integrity of the material. One critical area is the junction of the bolt head and bolt shaft. It has been found that operations such as drilling can result in the loss of some of the properities imparted by heat treating. Some fabricators may heat socket head cap screws before drilling holes used for retaining wires to lower the hardness and make drilling easier. Such practices will often result in no visible alteration and a Rockwell hardness test on the shaft may also show the metal to be hardened. However the head may actually be softened and the critical fillet at the head-shaft junction may be weakened. This area of the bolt is especially subject to failure from hydrogen embrittlement and numerous other metaluriegicial problems.

Non-metallic fasteners also have some similiar problems resulting from the nature of the stresses produced during use. Defects such as honey combing, bubbles, poor material set or others will result in failure of the material in the critical area joining the head and the shaft in both metallic and plastic materials.

Studs and other threaded fasteners may be tested to insure the integrity of the material in the area of thread run out. This area is a common failure location and this device can be adapted to test either one end or both ends at the same time if so desired.

Testing is normally performed by visual inspection, measuring the exterior dimensions and an edge test under load. One standard for the wedge test is the Socket Screw Standard published by the Socket Screw Products Bureau as SS-103. In this test a force is applied to one edge of the screw head by placing a wedge washer member under the screw head and subsequently appling a load on the shaft of the bolt. The resulting stress produces a concentrated tension load on one side of the shaft as well as a bending movement. The test is destructive by nature and the load at which failure occurs and location of the failure determine compliance with the test standards.

Although testing by the methods of SS-103 are an improvement over testing under uniform tension, there are several drawbacks to this method. First the tests are destructive and they do not have the versitility required to test fasteners of varying materials such as brass and plastic.

SUMMARY

This invention is a device to impart a predetermined load, within the elastic limit of the material, to a fastener head or threaded section. The load is selected to test the mechanical properties of a specimen and thereby increase the statistical probability of reducing failure in the ultimate use of the fastener. A wedge shaped unit is placed under the fastener head and the shaft is put under tension so that the bolt head is subjected to the predetermined load which will result in failure of the head if a defect is present. In a similiar manner the thread run-out area of studs or bolts can also be tested. For the purposes of this invention the wedge shaped unit must be fabricated at an angle to produce the theoretical load and moment diagrams as shown in FIG. 2.

The major current best method for testing fasteners is summarized in the following description:

SS—103: Method for tension testing of full size socket head cap with a wedge
  (1) This procedure is limited due to the fact that it can only test fasteners equal or greater than 3.5×nominal diameter through ½" and 3×nominal diameter over ½".
  (2) Procedure is used to test
    (1) Tensile strength
    (2) Head Quality
      (1) Proper flow line formed during cold or hot forging.
      (2) Proper fillet radius under head.
  (3) Head does not ever come in full contact with test wedge angled surface in the elastic range.
  (4) Eccential load is applied to bolt to make sure the fastener head is stronger than the nominal or root diameter of the fastener. Load is increased till fastener fails.

Figure 8:
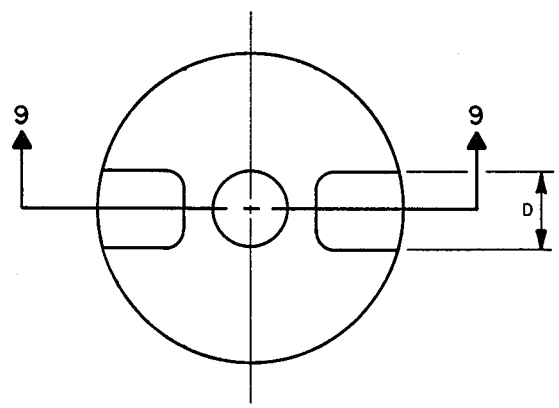
FIG. 8 is a plan view of a spacer which can be used for special length blots.

The dimension D is the approximate diameter of the fastener and R is the radius of the corner, as shown in FIG. 8.

DESCRIPTION OF THE PREFERRED EMBODIMENTS

The invention is a device to impart a predetermined stress on a cross section of a fastener at the junction between head and shaft or other critical area. A component of the system is a means to draw the fastener shaft into a state of tension. This means to draw is preferrably a threaded unit and a torque wrench used to determine the degree of tension using well known torque to tension relationships. It is the intent of the inventor to allow other means to draw, such as hydraulic members which clamp onto the shaft or lever devices to be used to produce the necessary tension in the shaft.

Figure 2:
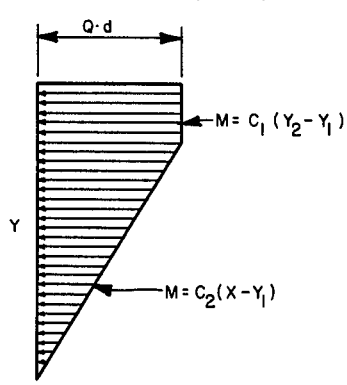
FIG. 2 is moment diagrams of a unit subjected to test stress using this invention.
Figure 2:
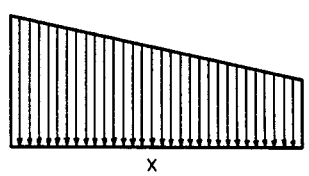
Figure 6:
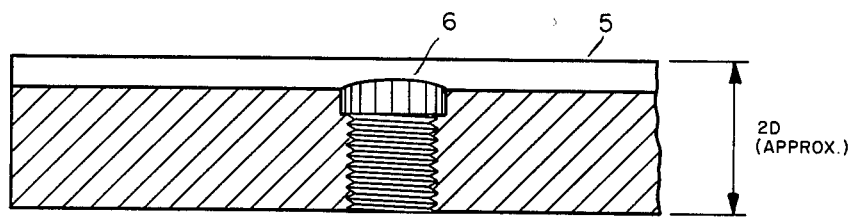
FIG. 6 is a section view of the angled test plate used to test fasteners to short for normal thread engagement used by the test procedure.
Figure 10:
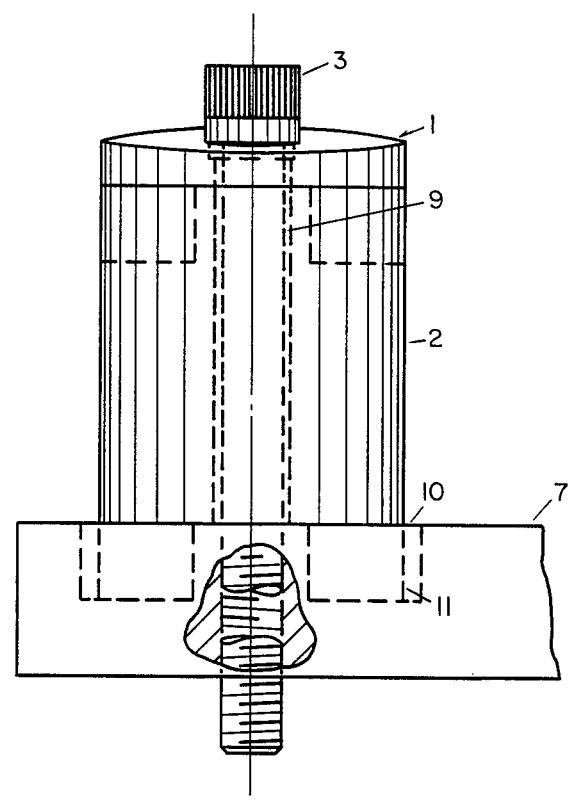
FIG. 10 shows the wedge (1) and spacer (2) for testing a fastener (3).

A wedge means which causes a stressing of the shaft near the fastener head when the wedge means is placed under the fastener head and the shaft put in tension is also required. The wedge mounting plate means and the fixed mounting plate are shown in FIG. 6 and FIG. 10. A wedge in the form of a washer with non-parallel faces forming angle $\theta$ which produces the force and moment relationships of FIG. 2 in a given fastener is also shown in FIG. 10. It is understood that a means to impart a force around the circumference of a fastener head, from the shaft side, in such a manner as to result in a moment diagram as shown in FIG. 2 is known as a wedge means. Such a wedge means may be constructed in several configerations, two of which are shown.

In all views $\theta$ is the wedge angle, L is a length, D is the approximate diameter of the bolt being tested, R is a radius and C is a nominal thickness.

Figure 5:
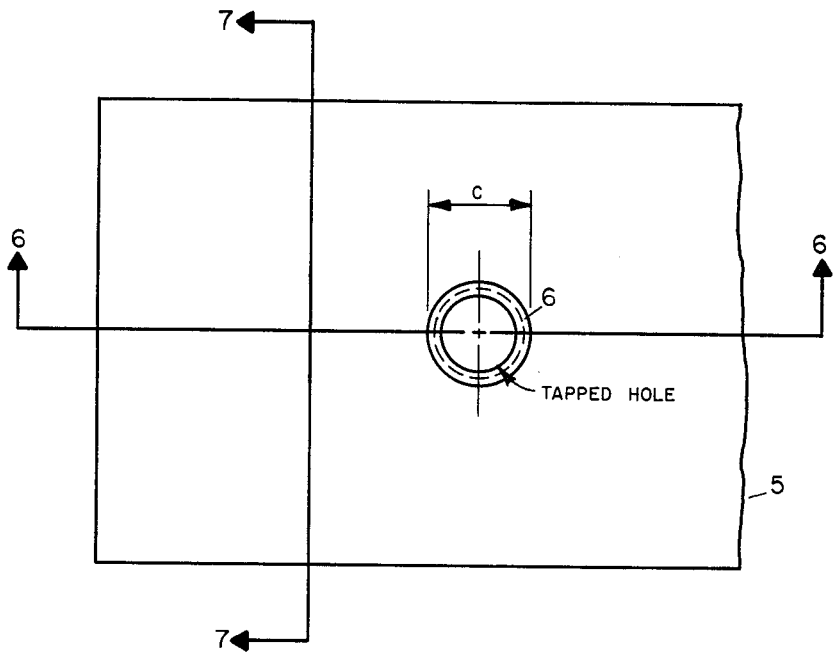
FIG. 5 is a plan view of a preferred method of constructing a test plate for use in the invention.
Figure 7:
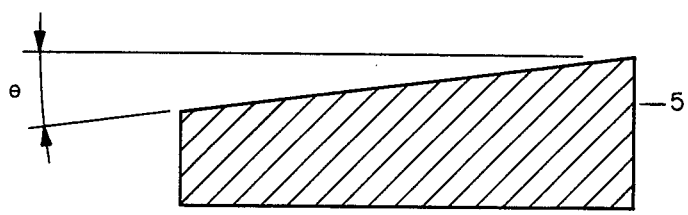
FIG. 7 is a view of the test plate showing the angle $\theta$ chosen to produce the load and moment diagram of FIG. 2.
Figure 9:
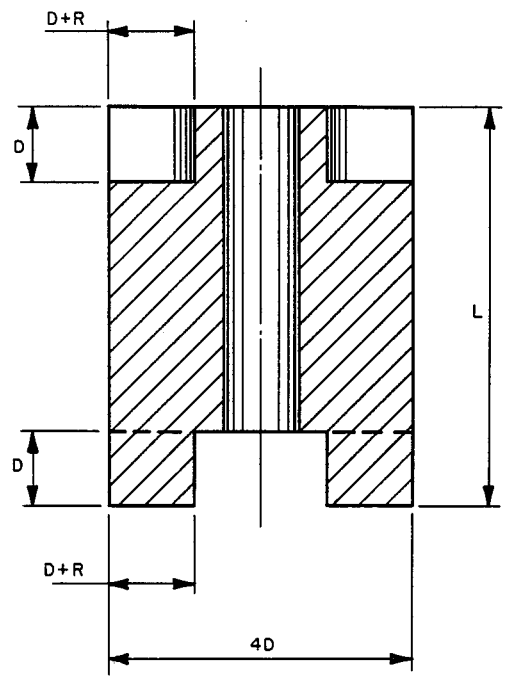
FIG. 9 is a section view of the spacer of FIG. 8.
Figure 12:
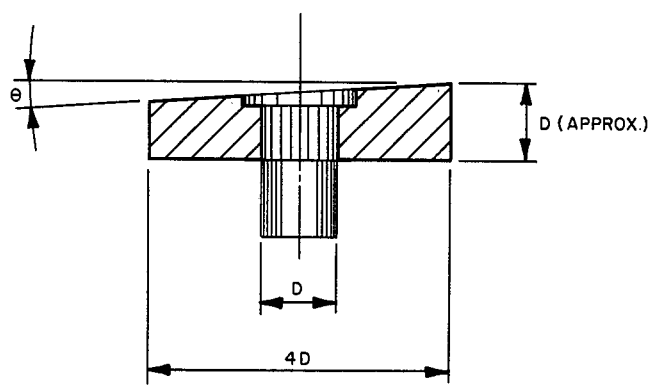
FIG. 12 is a section of the wedge unit of FIG. 9.
Figure 13:
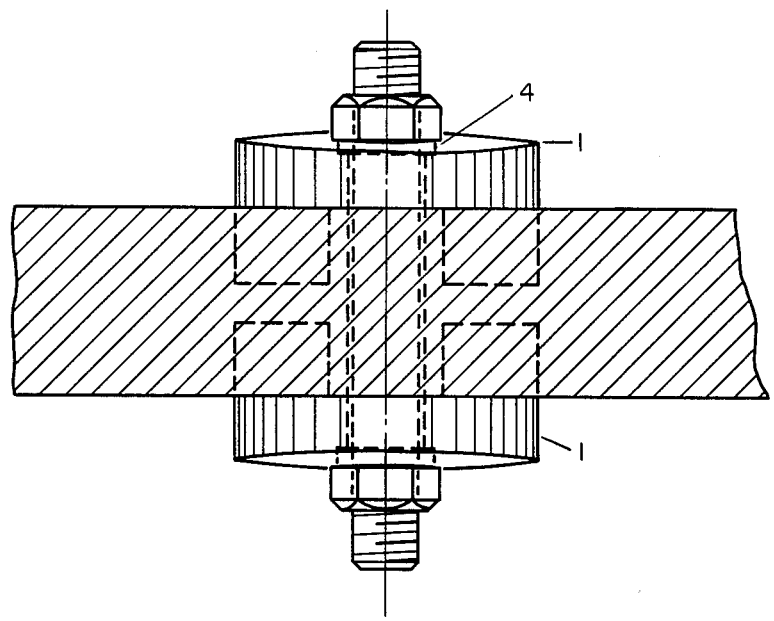
FIG. 13 is a section view of a test plate with two wedge units for testing the thread run-out area (4) of both ends of a fastener stud at the same time.

In the accompanying drawings a means to draw may be the threaded base member (5) in FIGS. 5,6, and 7. A fastener is inserted into the hole (6) and drawn down with a torque wrench which is the preferred means to draw for the illustraded devices. An alternate threaded base (7) is shown in FIG. 10. This allows a long shaft (9) to be tested with a spacer (2). Notches (10) in the alternate threaded base (7) secure the tabs (11) on the spacer in place. A wedge (1) in FIG. 12 is used with the spacer of FIG. 9 in the configeration shown in FIG. 10 for testing a long shaft (9) fastener.

Figure 3:
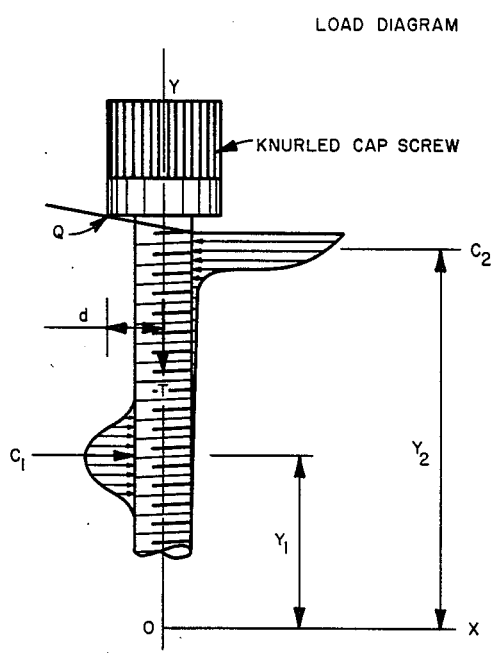
FIG. 3 is a load diagram associated with FIG. 1.
Figure 4:
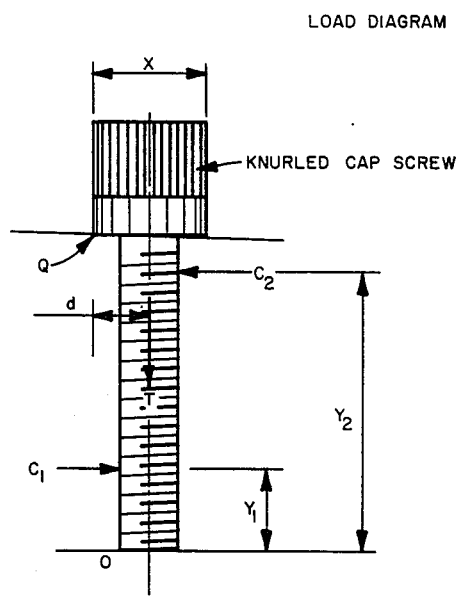
FIG. 4 is a load diagram associated with FIG. 2.
Figure 1:
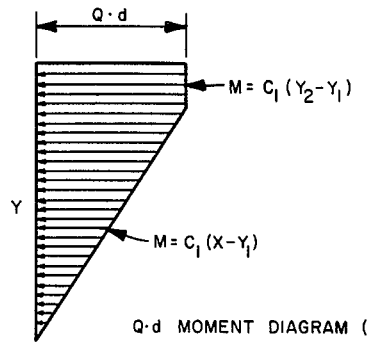
FIG. 1 has two moment diagrams of the current technology in which a force is produced on only one side of the fastener head.
Figure 1:
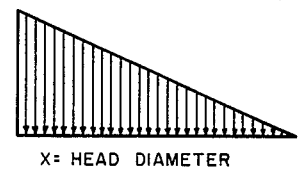

In the intended use of this invention the fastener head or face of a nut is drawn down against a wedge means to produce the loads shown in FIG. 4 which results in an effective test of the fastener material.

To better understand the method of use of the device in relation to other standard tests, a procedure based on the normal military test format is presented.

MILITARY STANDARD INSPECTION TEST FOR HIGH STRENGTH SOCKET HEAD CAP SCREWS

Figure 11:
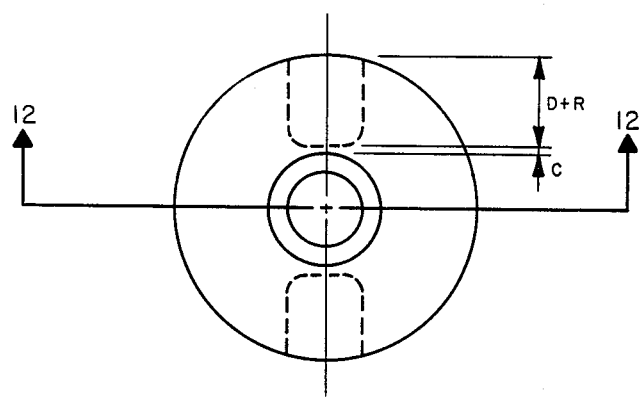
FIG. 11 is a plan view of the wedge of FIG. 8.

1. Scope.
1.1 This method outlines a standard procedure for inspection of externally threaded high strength fasteners. This procedure applies to all types of externally threaded high strength fasteners (grade 8 or $R_c \geqq 33$) which may be subjected to any type of embrittlement and is not limited by configuration or size.
2. Documents Applicable to Military Standard Inspection Test For High Strength Socket Head Cap Screws.
   GGG-W-686—Wrench, Torque
   Mil-A-13881—Thread Compound, Antiseize, Mica Base
   Mil-T-6868—Inspection Process, Magnetic Particle
   FF-S-86—Federal Specification Screw, Cap, Socket Head
3. Apparatus
3.1 Torque Method of Loading.
   Torque wrenches calibrated for accuracy within the limits specified by GGG-W-686 will be required, as well as the necessary adaptors to fit the configuration of the fastener under test. Also required are the steel threaded test plates as shown on FIGS. 5 and 6, heat treated to a minimum hardness of Rockwell c 50 or steel spacers and/or angled test washers as shown on FIGS. 11 and 12 heat treated to a minimum hardness of Rockwell c 50, with sufficient strength to develop full tensile strength requirement specified in this document of the fastener being tested.

4. Test Specimen Sample Size.
   The number of specimens to be tested from each lot shall be as specified in MIL-STD-105 general inspection level II for visual and dimensional testing. From the visual and dimensional sample a destructive sample will be randomly selected to a destructive S-4 sample size in accordance to the original population or lot under inspection. The destructive sample selected will undergo all tests for mechanical properties.
5. Procedures

5.1 Visual and Dimensional Tests.

Dimensions to be checked: (See FIG. 4).
  J - socket width across flats
  T - key engagement
  JD - socket depth
  A - head diameter
  H - head height
  R - fillet extension
  N - number of holes
  L - length
Visual Inspection:
thread discontinuities        ⎛  FF-S-86 pp. 3.7.1.1  ⎞
socket discontinuities        ⎨       SS-101          ⎬
head & socket concentricity   ⎝       ANSI B18.3      ⎠
Coating coverage 5.2 Mechanical Properties Test.
5.2.1 Rockwell c reading will be taken on threaded end of fastener being tested.
5.2.2. Torques Method. Test fastener shall be assembled in the test units, utilizing not more than three spacers in accordance with FIG. 10. The threads of the fastener, and the bearing surface of angled washer, and threads in threaded test plate shall be lubricated with a lubricant conforming to Mil-A-13881. A minimum of two full threads of test specimen should extend below threaded test plate if possible. Threaded test plate will be held in test fixture and fastener under test will be torque loaded through the head. Induced loads will be for two torque values, one to test for hydrogen embrittlement, the other to test head configuration.
$L_H = U \frac{1}{4} (D)^2 (P)$ (hydrogen embrittlement)
$L_C = U \frac{1}{4} (D)^2 (P)$ (head configuration)
$T = KDL$ where $L = (L_H$ or $L_C)$
T = torque in inch pounds
K = coefficient of friction
D = nominal diameter of specimen (inches)
L = induced load (pounds) maximum load is created at yield point of material
P = percentage
U = ultimate tensile strength (minimum ultimate tensile strength required in specification)
6. Inspection Test Reports.
6.1 The inspection test report shall contain the following data:
Fastener description
Part number
Lot identification
Manufacturer
Vendor and vendor purchase order number
Project number and order to build number
Date
Name of inspector
Lot size
Fastener strength level
6.1.1 Dimensional requirements. Record both specification maximum and minimum dimensions along with measured dimension taken during inspection. (See FIG. 2).

Socket width across flats
Key engagement
Socket depth
Head height
Fillet extension
Number of holes
Length 6.1.2 Visual inspection requirements. Record whether or not specimen is within specified requirements of Federal Specification FF-S-86. (Pass or Fail).

Thread discontinuities
Socket discontinuities
Head and socket concentricity
Coating coverage All visual and dimensional requirements must be compared to Table IV of FF-S-86.

6.1.3 Mechanical properties inspected will be recorded as seen in specification requirement, maximum and minimum, values along with required test torque values, and actual torque values applied to sample under test.

Rockwell C
Hydrogen embrittlement test torque
Head configuration test torque 6.1.4 Inspection must then make a summary sheet of test results and state whether or not test samples meet specification requirements. If sample does not meet requirements of this test, it is to be considered non-conformant.

Having described the invention, we claim:

1. A testing device for fasteners, comprising a base member, a means to draw a fastener into tension, and at least one wedge means having a hole in it so that said means to draw a fastener into tension will put a tension on the fastener shaft resulting in bringing the fastener head into contact with the wedge means, said wedge means has a wedge angle specifically calculated to result in elastic bending and a predicted load in a section of the fastener shaft when said means to draw a fastner into tension is used to apply the predetermined force, the material of the wedge means is of sufficient strength to withstand the full tensil strength load of the fasteners and be heat treated to a minimum hardness of Rockwell C50 said means to draw the fastener into tension is capable of being used to determine the degree of tension applied which is found in the relationship $L = U \frac{1}{4} (D)2(P)$ when $L$ = induced load, $U$ = ultimate tension strength, $D$ = diameter, $P$ = percentage chosen to meet the final fastener user requirement, whereby a predetermined stress in the area of the fastener shaft near the fastener head is in theoritical eleastic deformation which will result in failure of the shaft if the actual material properities are of significantly lower grade then the theoritical predicted properities.

2. The invention of claim one wherein a spacer is used in conjunction with the means to draw and base member to accommodate longer fastener shafts.

3. The invention of claim one wherein the wedge means is one surface of said base member.

4. The invention of claim one wherein the fastener head is a nut threaded on a fastener shaft.

5. The invention of claim one wherein the wedge means is a washer shaped wedge.

6. The invention of claim one wherein the means to draw a fastener into tension is a torque wrench used in conjunction with a threaded base member.

7. The invention of claim one wherein said base member is used with two wedge means to test both ends of a fastener.

* * * * *